(12) United States Patent
Kitahara et al.

(10) Patent No.: US 6,640,090 B1
(45) Date of Patent: Oct. 28, 2003

(54) SIGNAL TRANSMITTER UTILIZING ASK MODULATION WAVE

(75) Inventors: Takahide Kitahara, Kariya (JP); Mitsugi Ohtsuka, Kariya (JP); Noritoshi Furuta, Okazaki (JP); Fumio Asakura, Okazaki (JP)

(73) Assignee: Denso Corporation, Kariya (JP)

( * ) Notice: Subject to any disclaimer, the term of this patent is extended or adjusted under 35 U.S.C. 154(b) by 476 days.

(21) Appl. No.: 09/616,371

(22) Filed: Jul. 13, 2000

(30) Foreign Application Priority Data

Jul. 28, 1999 (JP) ............................. 11-214033

(51) Int. Cl.[7] .............................. H03C 1/52; H04B 1/02
(52) U.S. Cl. ....................... 455/108; 455/129; 340/5.64
(58) Field of Search ................................. 455/108, 103, 455/127, 128, 129; 340/5.61, 5.72, 825.72; 375/300, 309, 315

(56) References Cited

U.S. PATENT DOCUMENTS

| 4,679,046 A | 7/1987 | Curtis et al. | |
|---|---|---|---|
| 4,760,394 A | * | 7/1988 | Takeuchi et al. ......... 340/10.42 |
| 4,873,530 A | * | 10/1989 | Takeuchi et al. ............ 343/711 |
| 6,122,492 A | * | 9/2000 | Sears .......................... 455/127 |
| 6,400,255 B1 | * | 6/2002 | Ohnishi et al. ............. 340/5.62 |

FOREIGN PATENT DOCUMENTS

| JP | 60-233942 | 11/1985 |
|---|---|---|
| JP | 64-33375 | 2/1989 |
| JP | 64-48981 | 2/1989 |
| JP | 09-261214 | 10/1997 |

* cited by examiner

Primary Examiner—Lee Nguyen
Assistant Examiner—Tsuleun Lei
(74) Attorney, Agent, or Firm—Posz & Bethards, PLC

(57) ABSTRACT

A synchronization circuit modulates a data signal with an amplitude shift keying (ASK) modulation method using an ASK modulation signal to output a modulated signal under the condition that the ASK modulation system and data signal are synchronized with each other. A drive circuit executes a push-pull operation based on the modulated signal and a resonance circuit resonates, under the push-pull operation of the drive circuit, to transmit a transmission signal in a radio wave. The synchronous signal controls a switching device to cut off a connection between the resonance circuit and the ground in synchronization with the modulated signal. Thereby, the transmission signal is generated sharply in the signal transmitter.

10 Claims, 12 Drawing Sheets

FIG. 6A
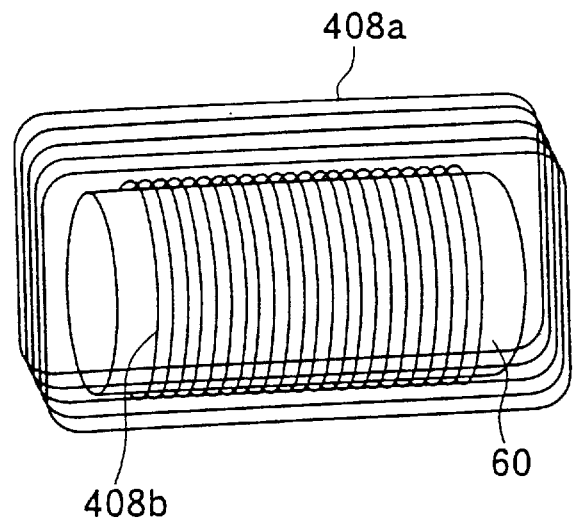
FIG. 6B
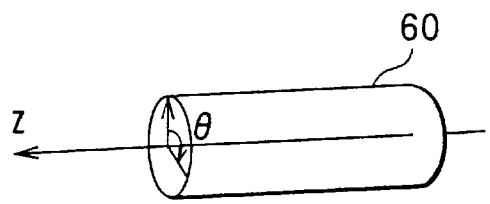
FIG. 7A  FIG. 7B
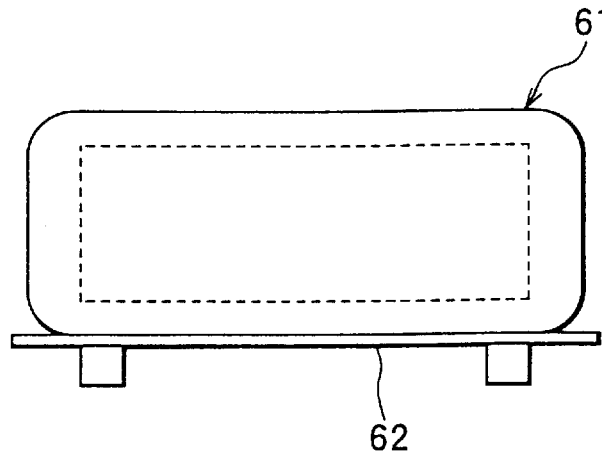
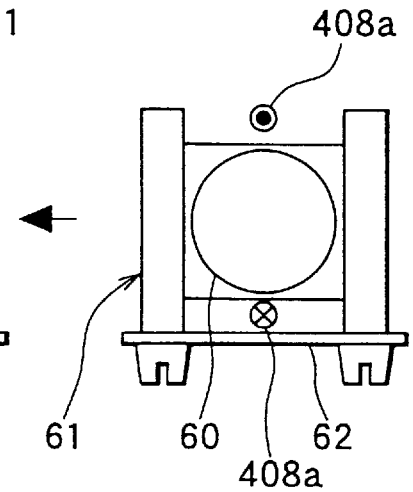

SYNCHRO REQUEST

RESONANCE (TRANSMISSION)

MODULATED REQUEST

SYNCHRO REQUEST

RESONANCE (TRANSMISSION)

tu

OFF  ON  OFF

US 6,640,090 B1

SIGNAL TRANSMITTER UTILIZING ASK MODULATION WAVE

CROSS REFERENCE TO RELATED APPLICATION

This application relates to and incorporates herein by reference Japanese Patent Application No. 11-214033 filed on Jul. 28, 1999.

BACKGROUND OF THE INVENTION

The present invention relates to a signal transmitter utilizing amplitude shift keying (ASK) modulation wave.

Conventional signal transmitters utilizing the ASK modulation wave are generally constructed as illustrated in FIG. 19. A modulator circuit 1 outputs a modulated signal through ASK modulation of data signal using a ASK modulation signal, and a CMOS inverter 2 performs push-pull operation based on the modulated signal from the modulator circuit 1. During the push-pull operation of the CMOS inverter 2, a coil antenna 3 receives a constant voltage (stable voltage) from a regulator circuit 4 and resonates together with a resonance capacitor 5. Thereby, the coil antenna 3 transmits a transmission signal (resonance signal) as a radio wave.

In this signal transmitter utilizing the ASK modulation wave, the rising time and falling time of the transmission signal waveform are determined with the coil antenna Q. Therefore, when the transmission rate of data signal is increased, the rising time (ta) and falling time (tb) of the transmission (TR) signal become longer and the signal waveform is not sharp enough as the transmission signal as illustrated in FIG. 20. Thereby, it is impossible to accurately demodulate the transmission signal in a signal receiver.

SUMMARY OF THE INVENTION

Therefore, the present invention provides a signal transmitter using the ASK modulation wave which generates a transmission signal in a sharp signal waveform.

According to the present invention, a signal transmitter comprises a modulator circuit for outputting a modulated signal through ASK modulation of a data signal using an ASK modulation signal, a push-pull circuit which performs the push-pull operation in response to the modulated signal output from the modulator circuit, a coil antenna and a capacitor. Moreover, the signal transmitter comprises a resonance circuit for transmitting the transmission signal using the radio wave through the resonance of coil antenna and capacitor during the push-pull operation of the push-pull circuit, and a switching device which is connected between the resonance circuit and the ground to perform the switching operation to connect and disconnect the resonance circuit and the ground. Thereby the modulator circuit is synchronized with the modulated signal to control the switching device to cut off the connection between the resonance circuit and the ground.

Thereby, when the resonance circuit and the ground are cut off by the switching device, the resonance energy is accumulated in the capacitor in the resonance circuit. The falling time of the transmission signal can be shortened. In addition, since the resonance energy is accumulated in the capacitor, resonance of the resonance circuit quickly starts and the rising time of the transmission signal can be shortened.

BRIEF DESCRIPTION OF THE DRAWINGS

Other objects, features and advantages of the present invention will become more apparent from the following detailed description made with reference to the accompanying drawings. In the drawings:

FIG. 6A is a perspective view of the coil antenna and column-type magnetic member of the first embodiment and FIG. 6B is a perspective view of the column-type magnetic member;

FIG. 7A is a front elevation of a holder in which the coil antenna is wound around the column-type magnetic member and FIG. 7B is a side elevation of the holder;

DETAILED DESCRIPTION OF THE PREFERRED EMBODIMENTS

First Embodiment

Figure 1:
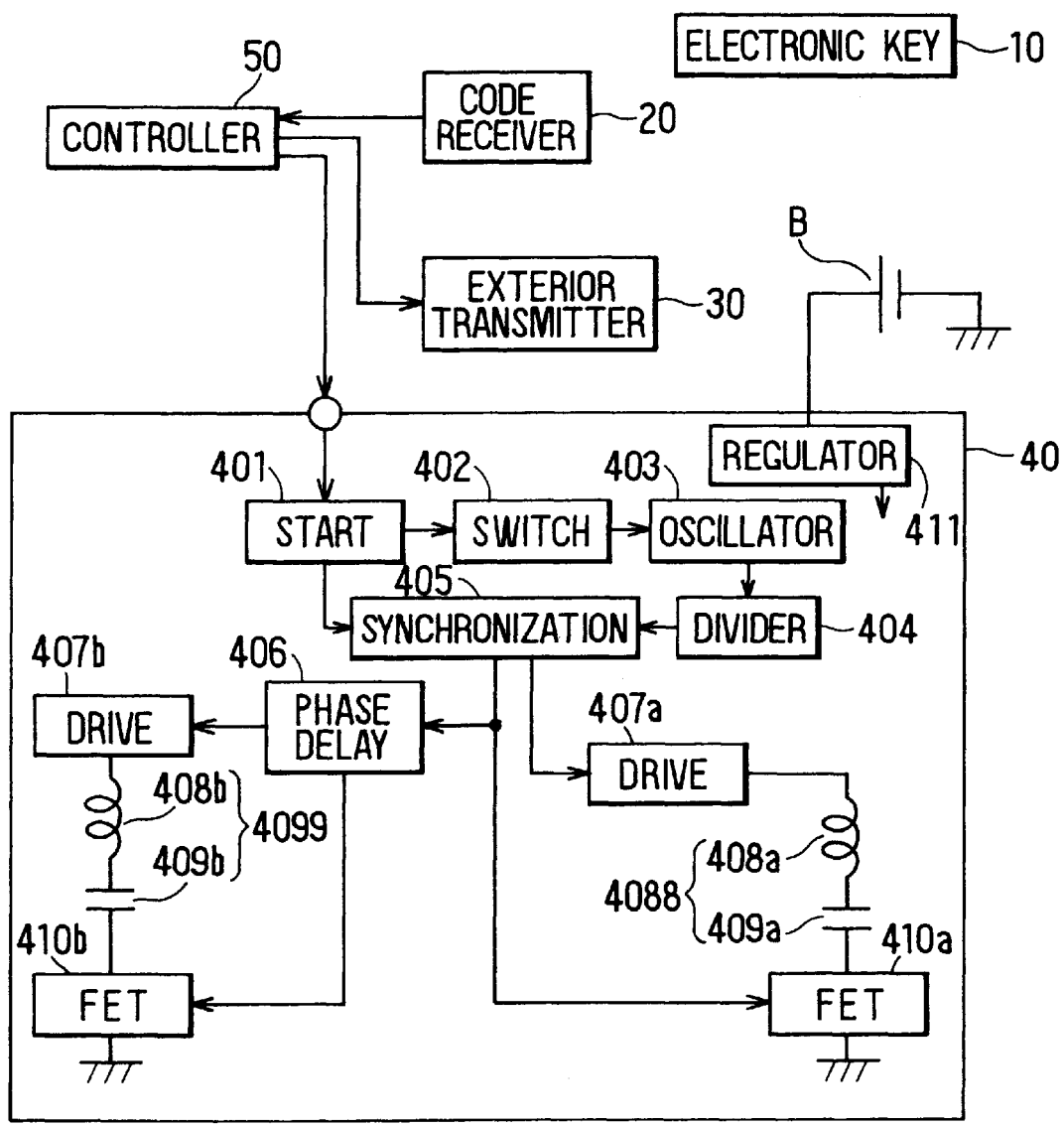
FIG. 1 is a block diagram illustrating an electronic key system of a first embodiment of the present invention.

FIG. 1 illustrates a first embodiment of an electronic key system for automobile (door lock control apparatus)

employing an interior signal transmitter utilizing the ASK modulation wave. The electronic key system comprises an electronic key 10, a code signal receiver 20, an exterior signal transmitter 30, an interior signal transmitter 40 and an electronic controller 50.

The electronic key 10 transmits, upon reception of any one of the exterior request signal from the exterior signal transmitter 30 and interior request signal from the interior signal transmitter 40 using the radio wave, an ID code signal using the radio wave. The code signal receiver 20 receives the ID code signal from the electronic key 10 using the radio wave and outputs the ID code signal to the controller 50. The exterior signal transmitter 30 receives the exterior request signal from the controller 50 and transmits the exterior request signal to the outside of the vehicle using the radio wave The interior signal transmitter 40 receives the interior request signal (data signal) from the controller 50 and transmits the interior request signal to the inside of the vehicle using the radio wave The controller 50 drives the exterior signal transmitter 30 and interior signal transmitter 40 and also executes collation of the ID code.

Figure 2:
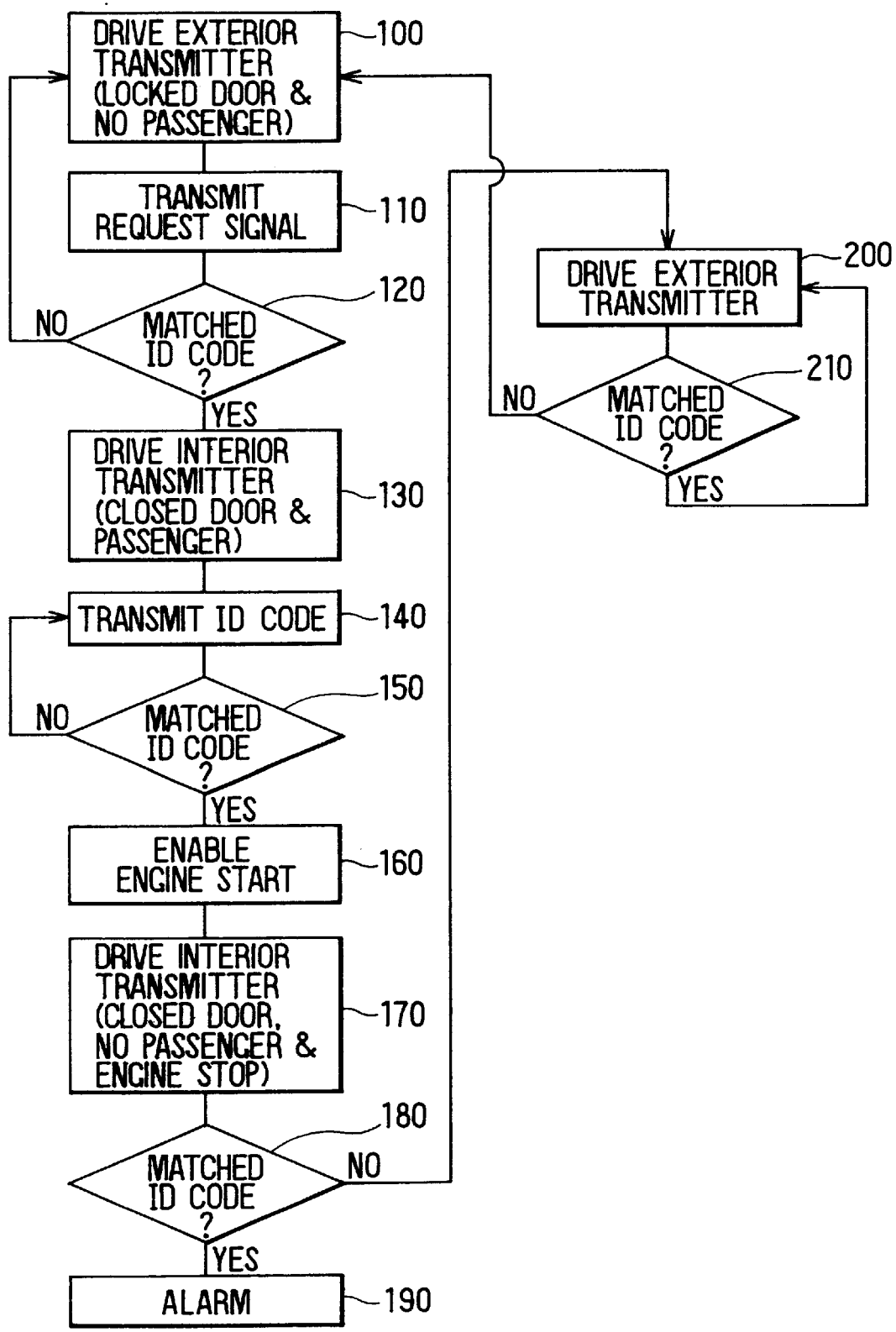
FIG. 2 is a flow diagram illustrating operation of the first embodiment.

The electronic key system, particularly the controller 50, is programmed to execute the processing illustrated in FIG. 2.

When the controller 50 determines that a door lock mechanism is operated to lock a door with a detection signal from a door lock sensor and also determines that a passenger is not in the inside of the vehicle with the detection signal from a passenger sensor, the controller 50 outputs an exterior request signal to the exterior signal transmitter 30 to drive the same (step 100).

Next, the exterior signal transmitter 30 transmits the transmits the exterior request signal using the radio wave, and the electronic key 10 receives the exterior request signal from the exterior signal transmitter 30 using the radio wave. The electronic key 10 transmits the ID code in return (step S110). When the code signal receiver 20 receives the ID code signal from the electronic key 10 in the radio wave, it outputs the ID code signal to the controller 50. This controller 50 collates the ID code of the ID code signal from the code signal receiver 20 with the previously stored ID code (step 120). Here, when the ID code of the ID code signal from the code signal receiver 20 is matched with the previously stored ID code, the controller 50 provides the result YES and unlocks the door.

Here, a passenger carrying the electronic key 10 takes the seat within the vehicle, the electronic key system executes the following processes.

First, the controller 50 determines, at step 130, that the door is closed with the detection signal from the door open/close sensor. When the controller 50 determines that a passenger is in the vehicle with the detection signal from a passenger detecting sensor, it outputs the interior request signal to the interior signal transmitter 40 (step 130).

When the electronic key 10 receives the interior request signal from the interior signal transmitter 40 in the radio wave, it transmits the ID code signal in the radio wave (step 140) and when the code signal receiver 20 receives the ID code signal from the electronic key system 10 in the radio wave, it outputs the ID code to the controller 50. The controller 50 collates the ID code of the ID code signal from the code signal receiver 20 with the previously stored ID code (step 150). When the ID code of the ID code signal from the code signal receiver 20 is matched with the previously stored ID code, the controller 50 provides the result YES to instruct an engine controller to start the ignition (step 160).

The controller 50 determines that the door is closed with the detection signal from the door open/close sensor and also determines that a passenger is in the vehicle with the detection signal from the passenger detection sensor. When the controller 50 determines that the engine stops with an engine ration signal from an alternator, it outputs the interior request signal to the interior signal transmitter 40 (step 170).

Thereby, the interior signal transmitter 40 transmits, as in the case of the step 130, the interior request signal in the radio wave and when the electronic key 10 receives the interior request signal from the interior signal transmitter 40 in the radio wave, it transmits the ID code signal in the radio wave. When the code signal receiver 20 receives the ID code signal from the electronic key 10 in the radio wave, it outputs the ID code signal to the controller 50.

The controller 50 collates the ID code of the ID code signal from the code signal receiver 20 with the previously stored ID code (step 180), and it provides the result YES when the ID code of the ID code signal from the code signal receiver 20 is matched with the previously stored ID code and urges an alarm unit to generate an alarm (step 190). Thereby, it is notified to a passenger that the electronic key 10 is left within the inside of vehicle.

Moreover, the controller 50 provides the result NO at step 180 when the ID code of the ID code signal from the code signal receiver 20 is mismatched with the previously stored ID code. Next, the controller 50 outputs the exterior request signal to the exterior signal transmitter 30 (step 200), and the exterior signal transmitter 30 transmits the exterior request signal in the radio wave. Thereafter, when the electronic key 10 receives the exterior request signal in the radio wave, it transmits the ID code signal in the radio wave. When the code signal receiver 20 receives the ID code signal in the radio wave, it outputs the ID code signal.

The controller 50 collates the ID code of the ID code signal from the code signal receiver 20 with the previously stored ID code(step 210). When the ID code of the ID code signal is matched with the previously stored ID code, the controller 50 provides the result YES, it executes the process of step 200. On the other hand, when the, controller 50 provides the result NO because the ID code of the ID code signal is mismatched with the previously stored ID code, it executes the process of step 100.

Here, when a passenger carrying the electronic key 10 is outside of the communication area between the electronic key 10 and code signal receiver 20, the controller 50 provides the result NO because of mismatch between the ID code of the ID code signal and the previously stored ID code and drives the door lock mechanism to lock the door.

As illustrated in FIG. 1, the interior signal transmitter 40 is comprised of a start circuit 401, a switching circuit 402, an oscillation circuit 403, a frequency divider circuit 404, a synchronization circuit 405, a phase delay circuit 406, drive circuits 407*a*, 407*b*, coil antennas 408*a*, 408*b*, resonance capacitors 409*a*, 409*b*, N-type FETs 410*a*, 410*b* and a regulator circuit 411.

Figure 4:
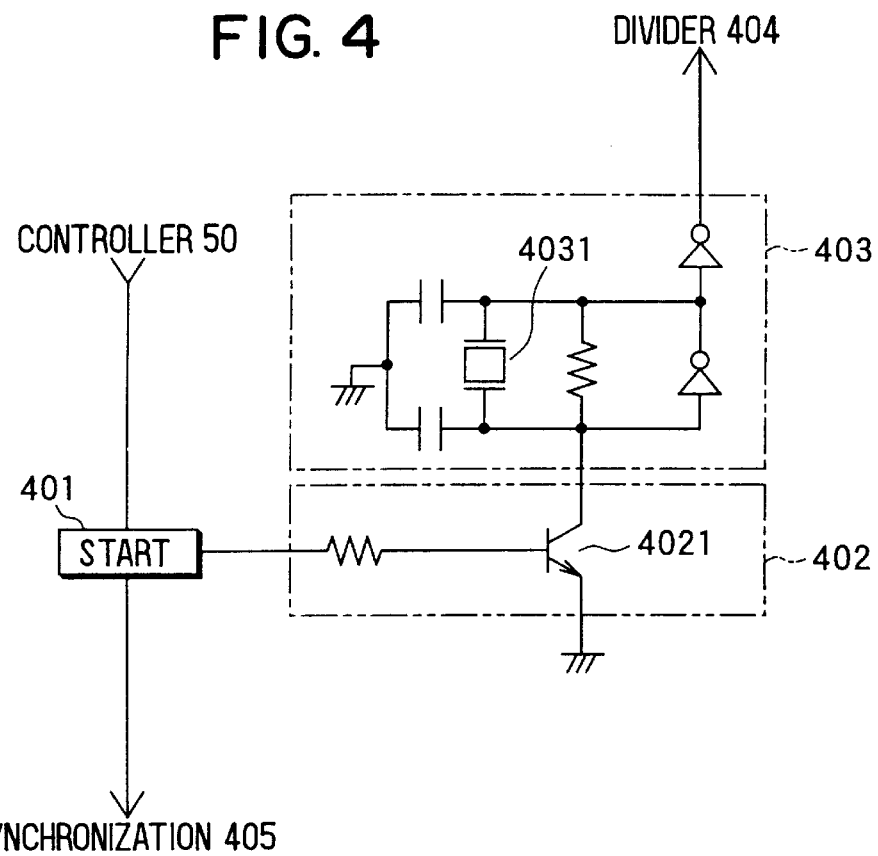
FIG. 4 is a circuit diagram illustrating a start circuit, oscillation circuit and switching circuit of the first embodiment.

The start circuit 401 outputs the interior request signal to the synchronization circuit 405. It also outputs, when the interior request signal is input, the start signal (low level signal) to the switching circuit 402 at the rising time (ta) of the interior request signal. The switching circuit 402 comprises a transistor 4021 as illustrated in FIG. 4. When the start signal (low level signal) is not yet input, the transistor 4021 turns on to connect the oscillation circuit 403 and the ground. When the start signal is input, the transistor 4021 turns off to cut off the connection between the oscillation circuit 403 and the ground.

The oscillation circuit 403 comprises a crystal controlled oscillator 4031. It starts when the switching circuit 402 cuts off the connection to the ground. The oscillation begins and accordingly provides an oscillation signal because the connection between one terminal of the crystal-controlled oscillator 4031 and the ground is cut off. Thereby, the oscillator circuit 403 starts when the interior request signal is input to the start circuit 401 from the controller 50, and the oscillation at the rising time of this interior request signal begins. In addition, the oscillation circuit 403 stops the oscillation when it is connected to the ground with the switching circuit 402 because one terminal of the crystal-controlled oscillator 4031 is connected to the ground.

The frequency divider circuit 404 receives the oscillation signal from the oscillation circuit 403 and outputs the frequency-divided signal to the synchronization circuit 405 after the frequency division. As the frequency of the frequency-divided signal, 134.2 kHz, for example, is used.

The synchronization circuit 405 modulates the interior request signal with the amplitude shift keying (ASK) modulation method using the frequency divided signal. It outputs the modulated request signal under the condition that the rising time of the interior request signal is synchronized with the rising time of the frequency divided signal. Moreover, as illustrated in FIG. 5, the synchronization circuit 405 outputs the interior request signal to the phase delay circuit 406 and N-type FET 410a under the condition that the rising time of the interior request signal is synchronized with the rising time of the frequency divided signal.

However, the interior request signal which is synchronized by the synchronization circuit 405 to rise with the rising time of the frequency divided signal is called the synchronization request signal. The frequency divided signal is used as the ASK modulation signal for the ASK modulation of the synchronization request signal. Moreover, the modulated request signal is used to resonate a series resonance circuits 4088, 4099.

The phase delay circuit 406 receives the synchronization request signal and outputs, to the N-type FET 410b, the delayed request signal in which the phase of the synchronization request signal is delayed as much as ¼ period (90 degrees). It also receives the modulated request signal from the synchronization circuit 405 and outputs the delayed request signal in which the phase of the modulated request signal is delayed as much as ¼ period (90 degrees).

Figure 5:
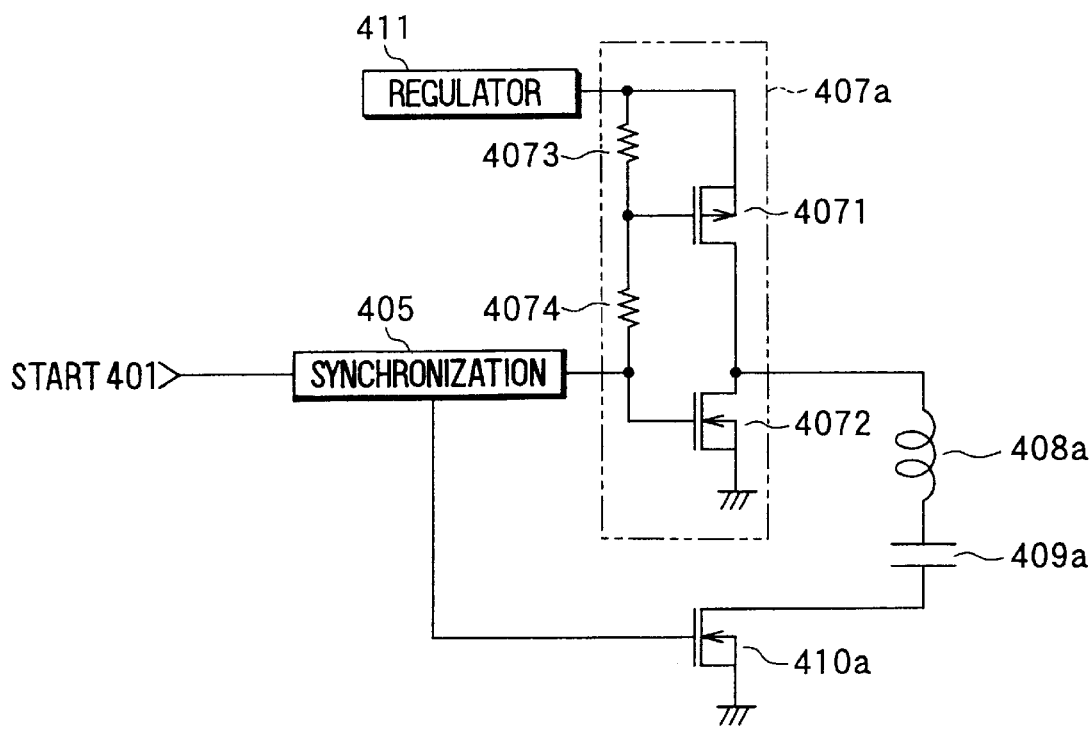
FIG. 5 is a circuit diagram illustrating a regulator circuit, a synchronization circuit, a drive circuit, a coil antenna, a resonance capacitor and the N-type FET of the first embodiment.

The drive circuit 407a is a CMOS inverter, as illustrated in FIG. 5, consisting of the P-type 4071 and N-type FET 4072 and receives the modulated request signal to execute the push-pull operation. The drive circuit 407b has a structure which is substantially the same as that of the drive circuit 407a to receive the delayed request signal from the phase delay circuit 406 for the push-pull operation.

Here, as illustrated in FIG. 5, in the drive circuit 407a, a resistance element 4073 is connected between the gate terminal and source terminal of P-type 4071, and a resistance element 4074 is connected between the gate terminal of the P-type 4071 and the gate terminal of the N-type FET 4072. With setting of the resistance ratio of the resistors 4073, 4074, the gate terminal voltage of the P-type 4071 is set and a current value to the coil antenna 408a from the regulator circuit 411 is set to the predetermined value. In addition, in the driver circuit 407b, a current value to the coil antenna 408b from the regulator circuit 411 is adjusted to the predetermined value like the drive circuit 407a.

The coil antenna 408a forms a series resonance circuit 4088 with the resonance capacitor 409a and resonates together with the resonance capacitor 409a under the push-pull operation of the drive circuit 407a, while the coil antenna 408b forms a series resonance circuit 4099 in combination with the resonance capacitor 409b and also resonates together with the resonance capacitor 409b under the push-pull operation of the drive circuit 407b. Thereby, the series resonance circuit 4088 resonates through the delay of ¼ period (90 degrees) of phase for the resonance by the series resonance circuit 4099.

Here, as illustrated in FIG. 6A, the coil antenna 408a is wound to surround both end surfaces of the column-type magnetic member 60 in the longitudinal direction (Z direction in FIG. 6B) and the coil antenna 408b is wound in the circumferential direction (θ direction in FIG. 6B) around the column-type magnetic member 60. Thereby, the coil antennas 408a, 408b are wound in orthogonal with each other. The column-type magnetic member 60 is inserted into a hollow holder 61 as illustrated in FIGS. 7A, 7B under the condition that the coil antennas 408a, 408b are wound. In FIGS. 7A, 7B, numeral 62 designates a printed circuit board.

Figure 3:
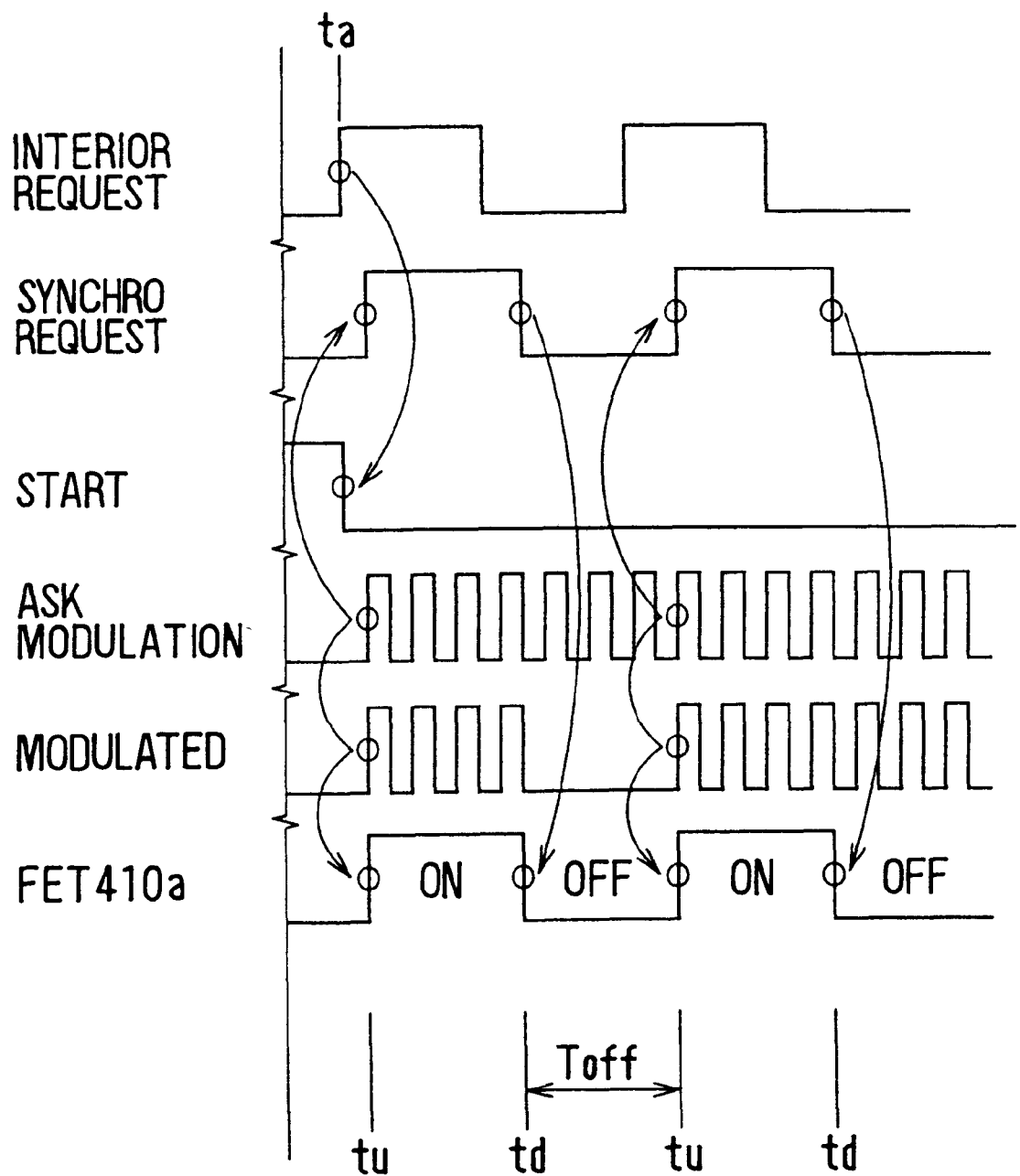
FIG. 3 is a timing diagram illustrating an interior request signal, a synchronization request signal, a start signal, an ASK modulation signal, a modulated signal and operation of a N-type FET in the first embodiment.

The N-type FET 410a is driven through the switching operation with the synchronization circuit 405 and turns on, as illustrated in FIG. 3, at the rising time (tu) of the synchronization request signal and also turns off at the falling time of the synchronization request signal. Thereby, the connection between the resonance capacitor 409a and the ground are cut off by the N-type FET 410a during the period ($T_{OFF}$) up to the rising time (tu) from the falling period of synchronization request signal (td).

The N-type FET 410b is driven through the switching operation with the phase delay circuit 406 and turns on at the rising time of the delay request signal and also turns off at the falling time of the delayed request signal. Thereby, the N-type FET 410b cuts off the connection between the resonance capacitor 409b and the ground during the period up to the rising time from the falling time of the delayed request signal.

The regulator circuit 411 receives an electric power from a battery B and supplies a regulated voltage to the start signal 401, switching circuit 402, oscillation circuit 403, frequency divider circuit 404, synchronization circuit 405, phase delay circuit 406, drive circuits 407a, 407b and series resonance circuits 4088, 4099. Thereby, the circuits 401 to 4099 can surely be operated without being influenced with variation of the output voltage of battery B.

Next, operation of the interior signal transmitter 40 will be explained. The start circuit 401 outputs the interior request signal from the controller 50 to the synchronization circuit 405 and also outputs the start signal to the switching circuit 402. The switching circuit 402 cuts off the connection between the oscillation circuit 403 and the ground when the transistor 44021 receives the start signal and turns off. Thereby, the oscillation circuit 403 starts the oscillation and outputs the oscillation signal, and the frequency divider circuit 404 divides the frequency and outputs the frequency divided signal.

The synchronization circuit 405 receives the frequency divided signal and interior request signal from the start circuit 401, and outputs the synchronization request signal and modulated request signal. The drive circuit 407a receives the modulated request signal from the synchronization circuit 405 to execute the push-pull operation.

During the push-pull operation of the drive circuit 407a, the coil antenna 408a resonates together with the resonance capacitor 409a and transmits the interior request signal in the radio wave. Here, the N-type FET 410a driven with the synchronization circuit 405 through the switching operation and turns off during the period ($T_{OFF}$) up to the rising time (tu) from the falling time (td) of the synchronization request signal to cut off the connection between the resonance capacitor 409a and the ground.

Moreover, the phase delay circuit 406 receives the synchronization request signal from the synchronization circuit 405 and modulated request signal. It outputs the delayed request signal and delayed modulated request signal, while the drive circuit 407b receives the delayed and modulated request signal to execute the push-pull operation. Under the push-pull operation of this drive circuit 407b, the coil antenna 408b resonates together with the resonance capacitor 409b and transmits the interior request signal in the radio wave.

Here, the N-type FET 410b is driven with the phase delay circuit 406 through the switching operation to turn off to cut off the connection between the resonance capacitor 409b and the ground during the period up to the rising time from the falling time of the delayed request signal.

As explained above, the interior signal transmitter 40 is controlled with the N-type FET 410a to cut off the connection between the resonance capacitor 409a and the ground during the period ($T_{OFF}$) until the rising time (tu) from the falling time (td) of the synchronization request signal.

Figure 8:
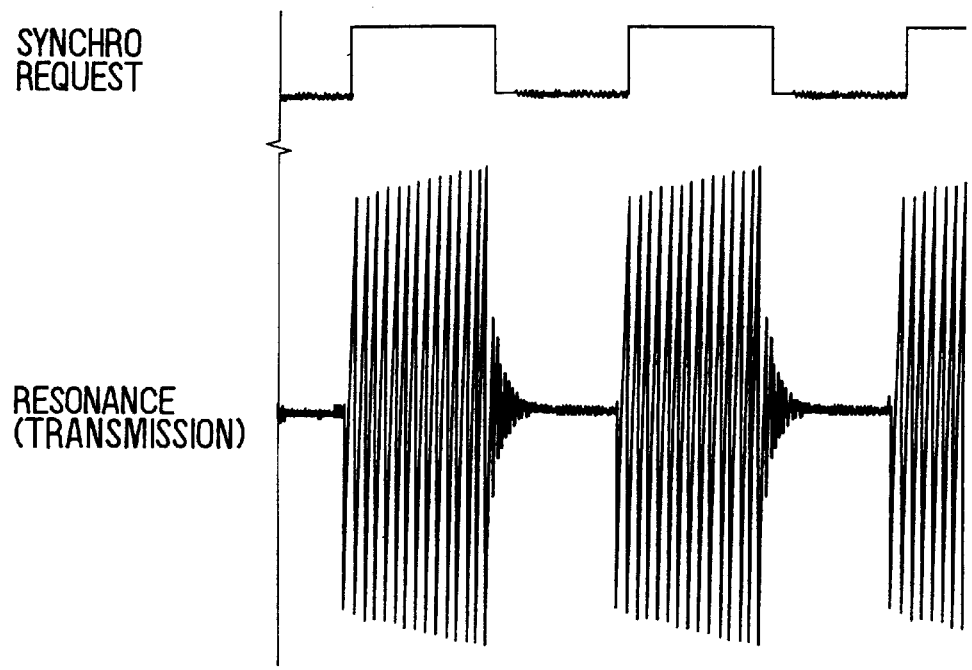
FIG. 8 is a signal waveform diagram of the synchronization request signal and resonance signal in the first embodiment.

Therefore, since resonance energy is accumulated in the resonance capacitor 409a when the connection between the resonance capacitor 409a and the ground is cut off in the resonance circuit 4088, the falling time of the resonance signal (transmission signal) is reduced. In addition, when the next resonance starts, since the resonance energy is already accumulated in the resonance capacitor 409a, new resonance starts quickly and the rising time of the resonance signal (transmission signal) can be reduced. Thereby, the rising time and falling time of the resonance signal (transmission signal) can be improved. Since dull of waveform of the resonance signal (transmission signal) can be controlled as illustrated in FIG. 8. The transmission rate of the interior request signal can be much improved.

Figure 9:
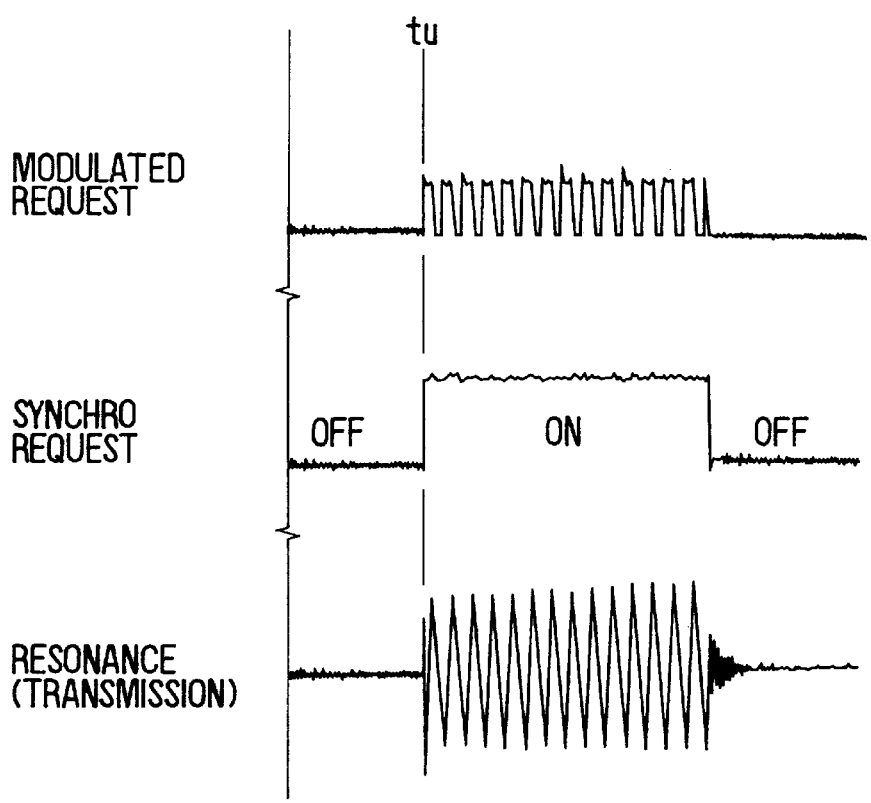
FIG. 9 is a signal waveform diagram of the modulated request signal, synchronous signal and resonance signal in the first embodiment.

Here, the N-type FET 410a is driven in synchronization with the synchronization request signal through the switching operation. Since the synchronization request signal is synchronized in its rising time (tu) with the rising time of the modulated request signal as illustrated in FIG. 9, waveform of the resonance signal (transmission signal) of the resonance circuit 4088 is not distorted.

Figure 10:
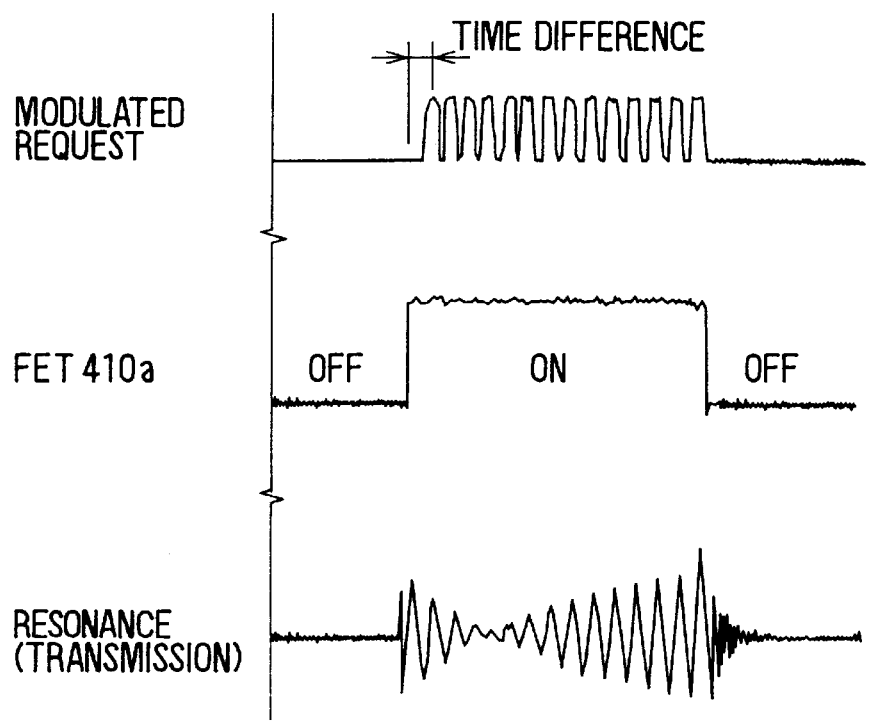
FIG. 10 is a signal waveform diagram of the resonance signal when the rising time of the switching signal of FET is delayed from the rising time of the modulated request signal.
Figure 11:
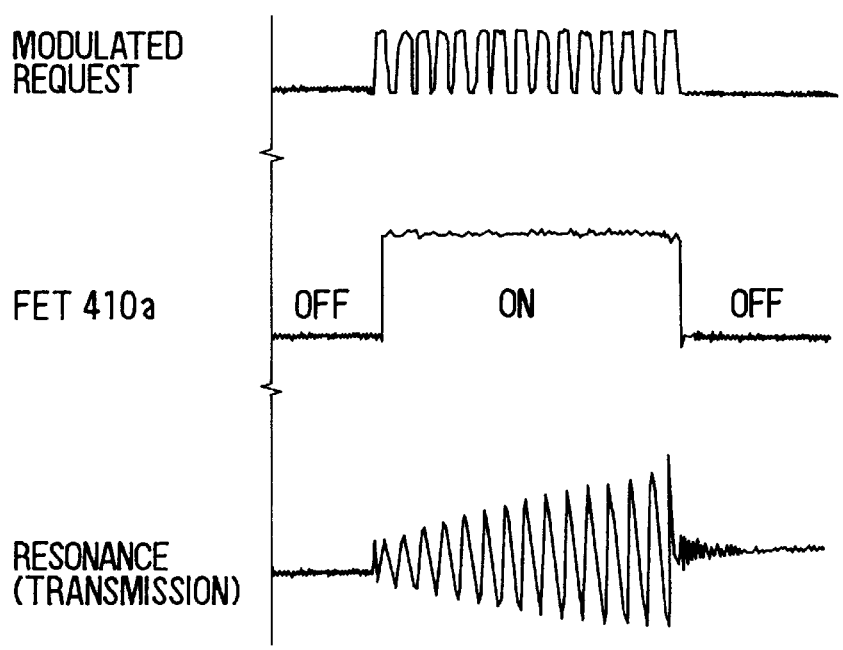
FIG. 11 is a signal waveform diagram of the resonance signal when the rising time of the switching signal of FET is leading the rising time of the modulated request signal.

For instance, the switching signal for switching the N-type FET 410a can control delay of the rising time and falling time of the resonance signal waveform when the rising time is leading the rising time of the modulated request signal as illustrated in FIG. 10 or when the rising time of the switching signal of N-type FET 410a is delayed from the rising time of the modulated request signal as illustrated in FIG. 11. However, the waveform of resonance signal (transmission signal) is distorted.

That is, when the rising time of the switching signal of the N-type FET 410a is mismatched with the rising time of the modulated request signal, the delay of the rising time and falling time in the waveform of the resonance signal can be controlled but the waveform of the resonance signal (transmission signal) is distorted.

Figure 12:
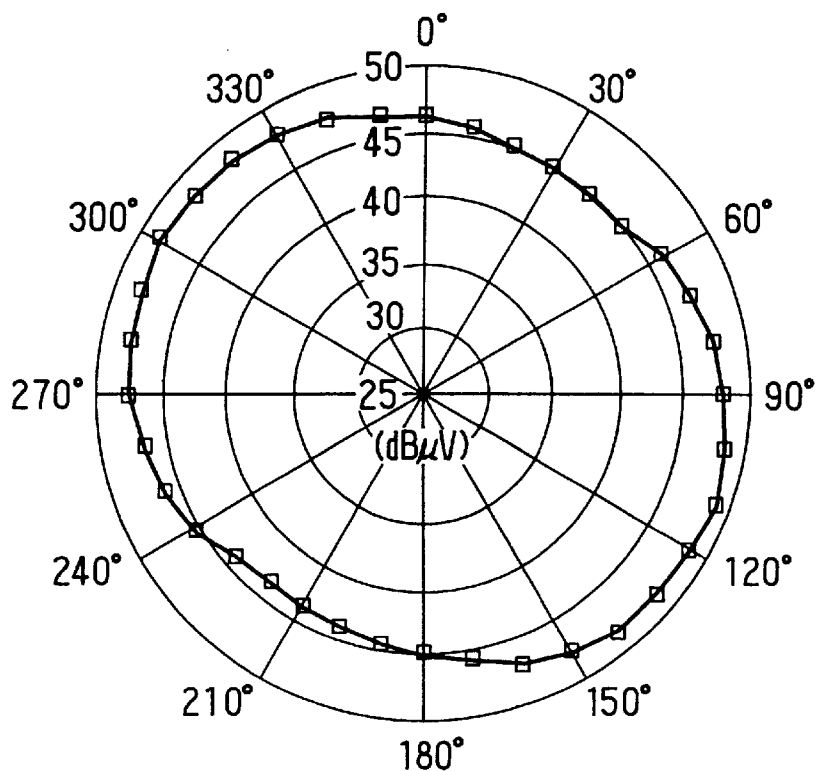
FIG. 12 is a diagram showing directivity of the coil antenna of the first embodiment.

Moreover, the coil antennas 408a, 408b are wound in the orthogonal relation to each other around the column-type magnetic member 60. In addition, since the resonance circuit 4088 resonates with deviation of the phase as much as ¼ period (90 degrees) for the resonance of the resonance circuit 4099, the coil antenna having no directivity may be used as the coil antennas 408a and 408b as illustrated in FIG. 12.

Therefore, since the interior request signal may be transmitted to the electronic key 10 from the interior signal transmitter 40 within the inside of the vehicle irrespective of the position of electronic key 10, the function to notify that the electronic key 10 is left in the inside of the vehicle to a passenger by issuing an alarm with an alarm device. For example, the principle that the coil antennas 408a, 408b do not have any directivity because the phase of the resonance of the resonance circuits 4088, 4099 is deviated by ¼ period (90 degrees) is the same as that of the turn style antenna.

Moreover, in the drive circuit 407a, a current value to the coil antenna 408a from the regulator circuit 411 is set to the predetermined value by setting the resistance ratio of the resistors 4073, 4074 illustrated in FIG. 5, while in the drive circuit 407b, a current value to the coil antenna 408b from the regulator circuit 411 is set to the predetermined value as in the case of the drive circuit 407a. Therefore, it is possible to set the directivity of the coil antennas 408a, 408b depending on the space condition at the inside of vehicle with higher accuracy.

Moreover, since the oscillation circuit 403 starts, when the interior request signal is input to the start circuit. 401 from the controller 50, the oscillation at the rising time of such request signal, power consumption of the circuit (for example, synchronization circuit 405) after the oscillation circuit 403 before the interior request signal is input to the start circuit 401 can be saved.

In addition, since the regulator circuit 411 is connected to the battery B to supply the regulated voltage to the circuits 401 to 4099, even if the voltage of battery B varies, stable drive voltage can be supplied to the coil antennas 408a, 408b. Therefore, since the stable transmitting output is generated from the coil antennas 408a and 408b, the stable communication area can be assured.

Figure 13:
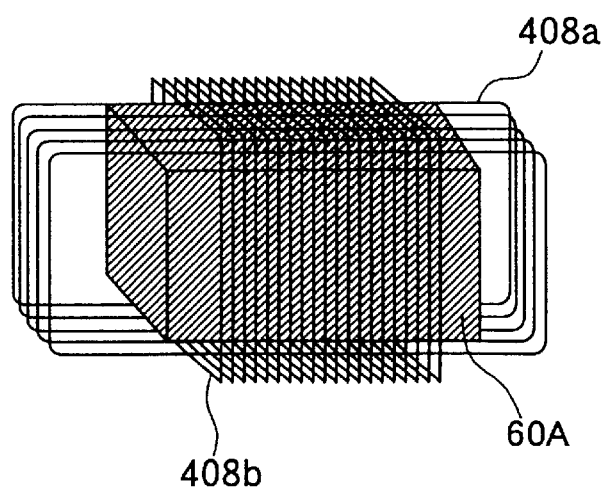
FIG. 13 is a perspective view of the coil antenna in a modification of the first embodiment.
Figure 14:
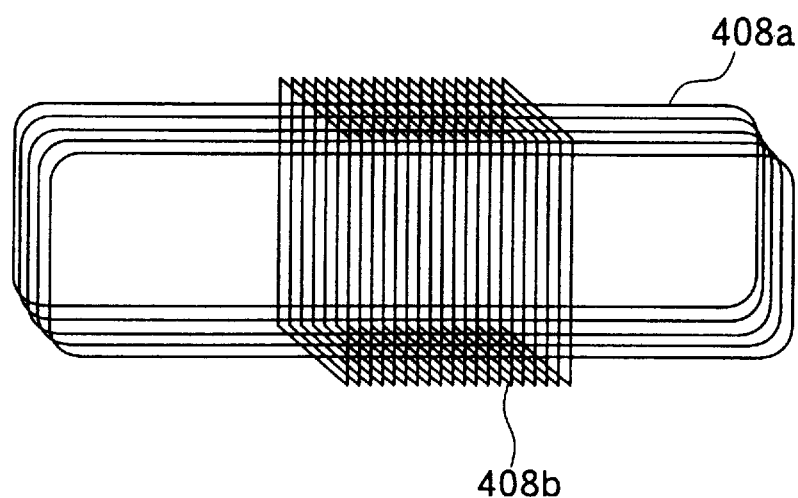
FIG. 14 is a perspective view of the coil antenna in a modification of the first embodiment.

On the occasion of embodying the present invention, a column-type magnetic member 60 may be replaced with a rectangular parallelopiped magnetic member 60A as illustrated in FIG. 13. Further, it is also possible to employ no magnetic member as illustrated in FIG. 14.

In addition, it is also possible to use the interior signal transmitter 40 using only one coil antenna. It is also possible to employ the parallel resonance circuit. It is also possible that the rising time of the frequency divided signal is synchronized with the rising time of the interior request signal. The interior request signal may have the period which is constant times the period of the frequency divided signal or not constant times the period of the frequency divided signal. In addition, the structure of FIG. 1, FIG. 4 and FIG. 5 may be adopted not only to the interior signal transmitter but also to the exterior signal transmitter.

Second Embodiment

Figure 15:
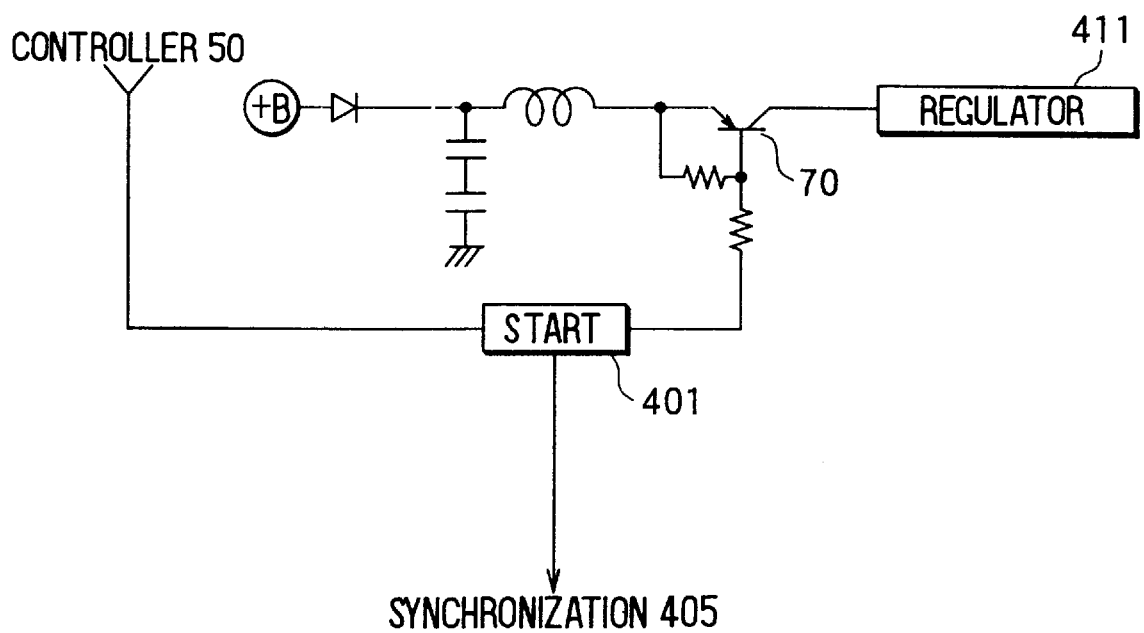
FIG. 15 is a circuit diagram illustrating a part of an electronic key system of a second embodiment of the present invention.

In a second embodiment, the regulator circuit 411 is connected to the positive terminal of the battery B only when the interior request signal is input to the start circuit 401 from the controller 50 as shown in FIG. 15. Specifically, a transistor 70 is connected between the positive terminal (+B) of the battery B and the input terminal of the regulator circuit 411.

Here, the start circuit 401 outputs, upon reception of the interior request signal from the controller 50, the start signal (FIG. 2) at the rising time of such request signal to the transistor 70. Thereby the transistor 70 turns on to connect the positive terminal (+B) of the battery B and the input terminal of the regulator circuit 411.

Accordingly, before the start circuit 401 receives the interior request signal, the positive terminal (+B) of the battery B is cut off from the input terminal of the regulator circuit 411. Therefore, before the start circuit 401 receives the interior request signal, the power feeding to the regulator circuit 411 from the positive terminal (+B) of the battery B can be stopped and therefore the power consumption before reception of the interior request signal by the start circuit 401 can be saved.

Third Embodiment

Figure 16:
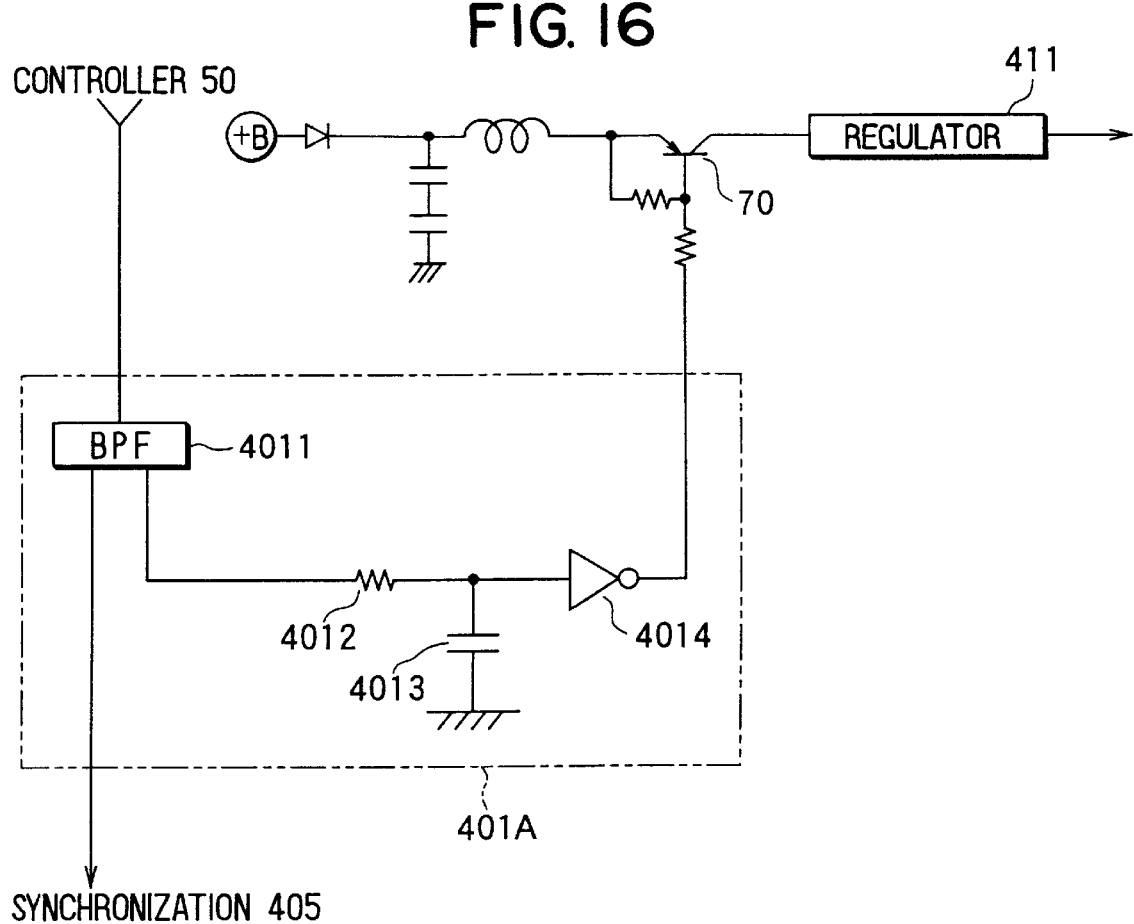
FIG. 16 is a circuit diagram illustrating a part of an electronic key system of a third embodiment of the present invention.

In a third embodiment, when the interior request signal is not yet input for a constant period, the input terminal of the regulator circuit 411 is cut off from the positive terminal of the battery B as shown in FIG. 16. Specifically, the start circuit 401A is used in place of the start circuit 401 of FIG. 15. The start circuit 401A is comprised of a band-pass filter 4011, a resistor 4012, a capacitor 4013 and an inverter 4014 and the capacitor 4013 forms a delay circuit in combination with the resistor 4012.

In this embodiment, when the interior request signal is input to the start circuit 401A from the controller 50, the capacitor 4013 is charged with the interior request signal. Therefore, under the condition that the interior request signal is input to the start circuit 401A from the controller 50, the inverter 4014 receives the high level signal on the basis of the charges accumulated in the capacitor 4013 and outputs the low level signal to the transistor 70.

Accordingly, the transistor 70 turns on by receiving the low level signal from the inverter 4014. Therefore, under the condition that the transistor 70 receives the low level signal, the input terminal of the regulator circuit 411 is continuously connected to the positive terminal of the battery B. The regulator circuit 411 is fed from the battery B when the interior request signal is input to the start circuit 401A from the controller 50 and thereby outputs the regulation voltage to the circuits 402 to 407a, 407b.

Figure 17:
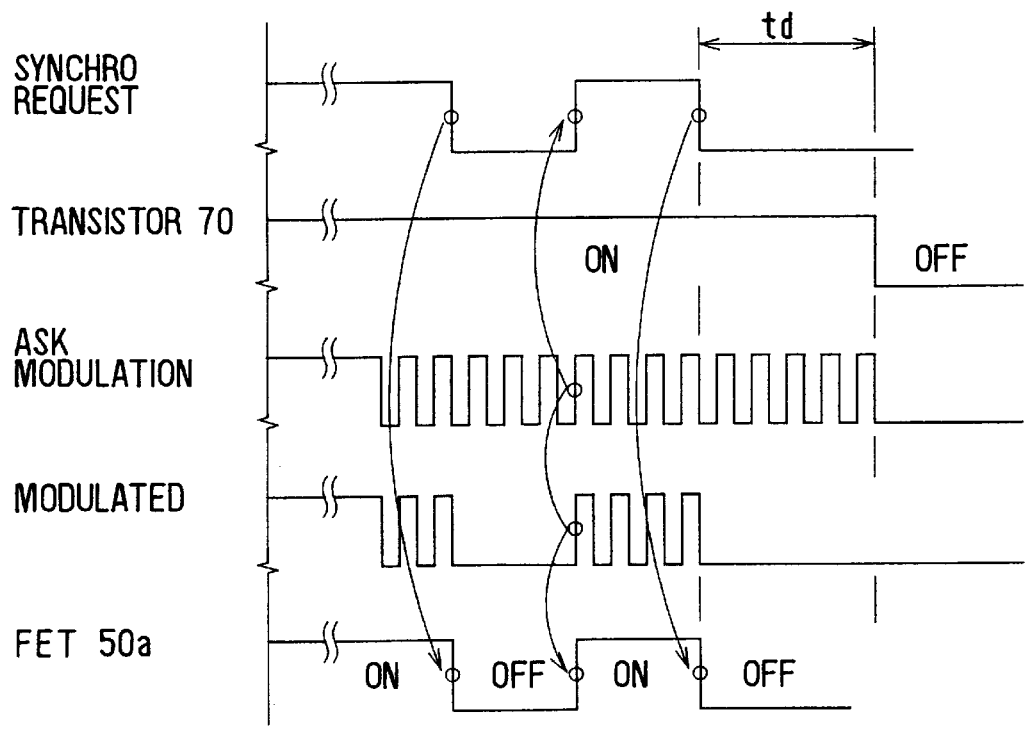
FIG. 17 is a timing diagram illustrating a synchronization request signal, operation of transistor, ASK modulation signal, modulated signal and operation of N-type FET in the third embodiment.

As illustrated in FIG. 17, moreover, if the interior request signal is not yet input to the start circuit 401A, charges accumulated in the capacitor 4013 is discharged through the resistor 4012 during the setting time (td) determined by the time constant of the delay circuit. The inverter 4014 receives a low level signal and outputs a high level signal. Therefore, the transistor 70 turns off upon receiving the high level signal from the inverter 4014, and the input terminal of the regulator circuit 411 is disconnected from the positive terminal of the battery B. Accordingly, when the interior request signal is not yet input during the preset period td, the regulator circuit 411 stops output of the regulation voltage to the circuits 402 to 407a, 407b.

Therefore, since the feeding and stoppage of feeding to the regulator circuit 411 from the battery B may be switched depending on the input of the interior request signal to the start circuit 401A, power consumption (dark current) of the interior signal transmitter 40 when the interior request signal is not yet input can be saved. In addition, since the regulator circuit 411 outputs the regulation voltage to the synchronization circuit 402 during the period until the preset time (td) from the end of the interior request signal, the N-type FET 410a is controlled with the synchronization circuit 402 to turn off.

Accordingly, the resonance circuit 4088 formed of the coil antenna 408a and resonance capacitor 409a accumulates the resonance energy generated with the interior request signal pulse within the resonance capacitor 409a.

Therefore, when the interior request signal is newly input during the period until the preset time (td) from the end of interior request signal, any delay is not generated at the rising time of the resonance signal (transmission signal) by the new interior request signal and any dull of the resonance signal (transmission signal) waveform can be suppressed.

Fourth Embodiment

Figure 18:
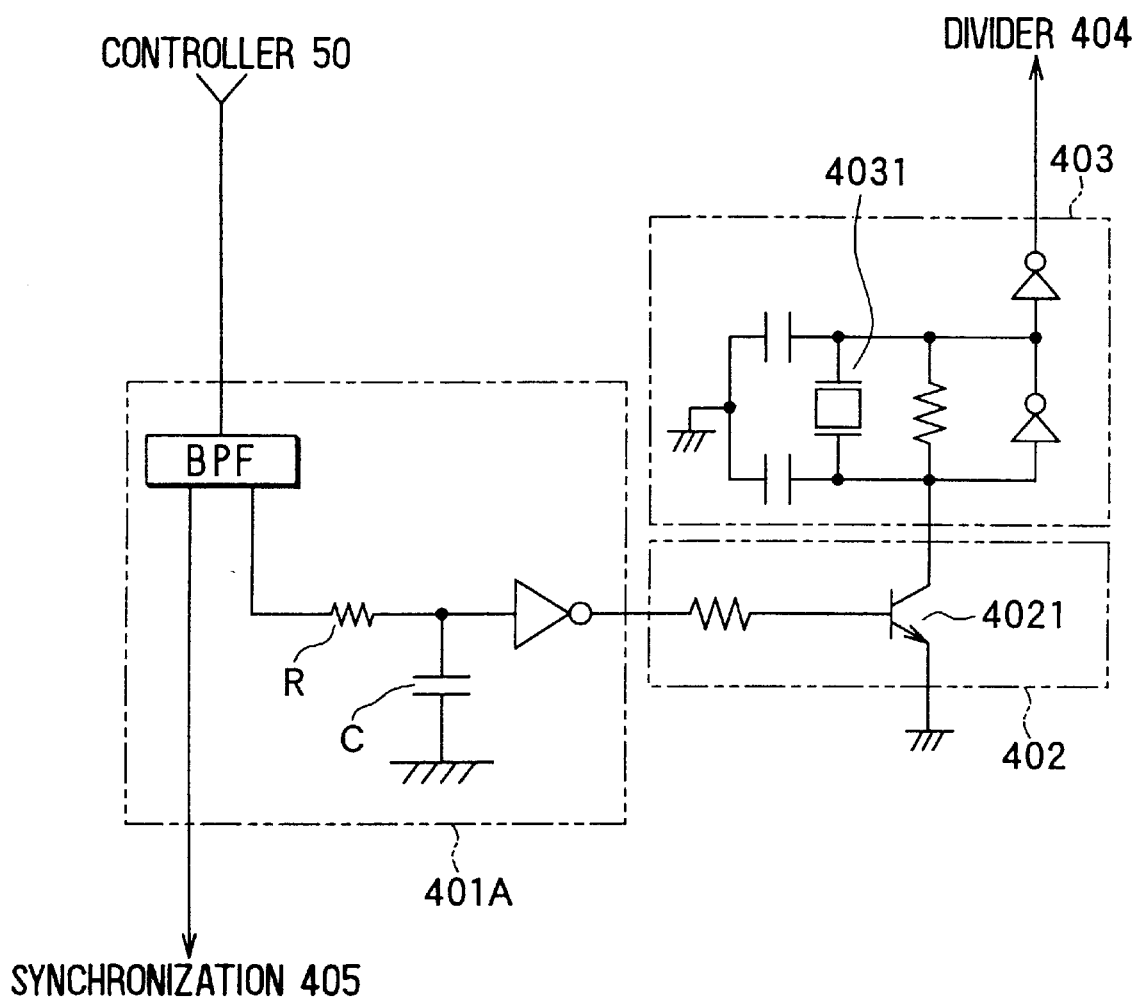
FIG. 18 is a circuit diagram illustrating a part of an electronic key system of a fourth embodiment of the present invention.
Figure 19:
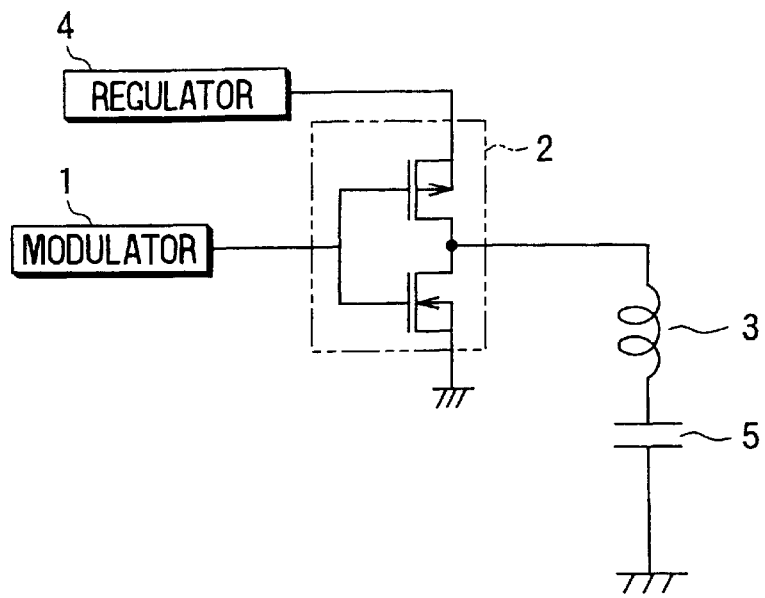
FIG. 19 is a circuit diagram illustrating a conventional signal transmitter.
Figure 20:
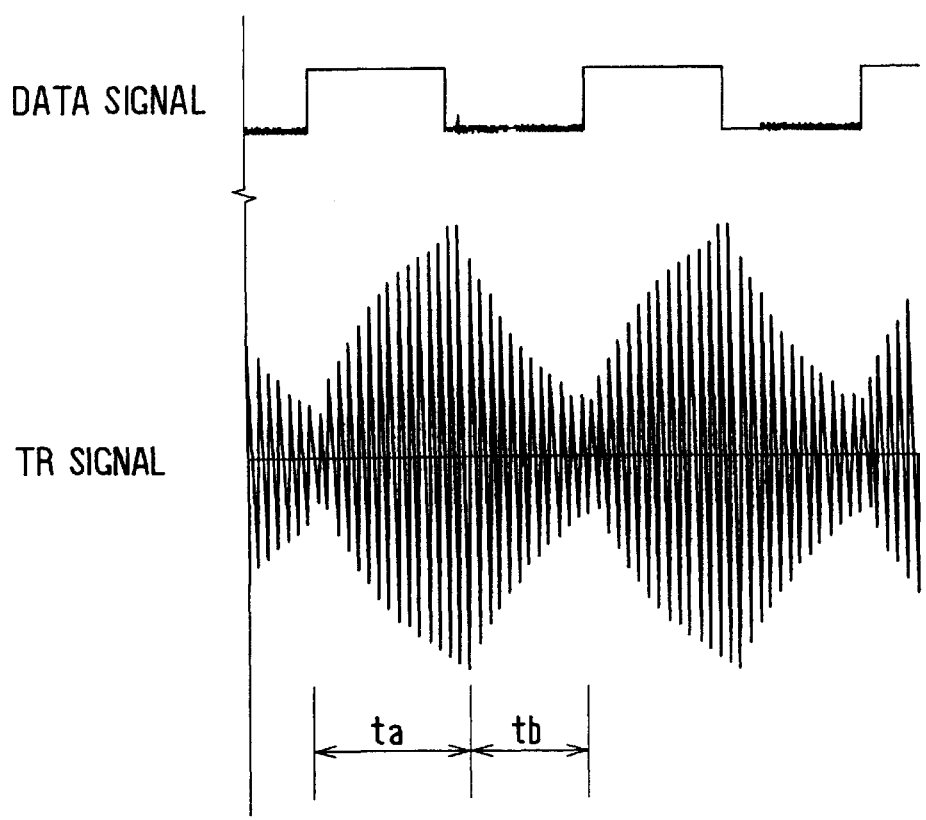
FIG. 20 is a signal waveform diagram of a data signal and transmission signal in the conventional transmitter.

In a fourth embodiment, the start circuit 401A of FIG. 16 is used to start and stop the oscillation of the oscillator circuit 403 depending on the input of the interior request signal as shown in FIG. 18. Thereby, when the interior request signal is not yet input to the start circuit 401A, the oscillation circuit 403 stops the oscillation and the power may be saved.

The present invention should not be limited to the disclosed embodiments and modifications, but may be implemented in many other ways without departing from the spirit of the invention.

What is claimed is:

1. A signal transmitter utilizing an ASK modulation wave, the signal transmitter comprising:

a modulator circuit for outputting a first modulated signal through an ASK modulation of a data signal using an ASK modulation signal under a condition that the ASK modulation signal and data signal are synchronized with each other;

a first push-pull circuit for executing a push-pull operation based on the first modulated signal;

a first resonance circuit including a first coil antenna and a first capacitor, the first resonance circuit for transmitting a transmission signal in a radio wave through a resonance of the first coil antenna and the first capacitor under a condition that the first push-pull circuit is executing the push-pull operation; and a switching device connected between the first resonance circuit and a ground for switching to disconnect or connect the first resonance circuit and the ground, wherein the modulator circuit controls the switching device to cut off a connection between the first resonance circuit and the ground in synchronization with the first modulated signal.

2. The signal transmitter as in claim 1, wherein:

the signal transmitter is located within an inside of a vehicle for communication with a hand-held signal transmitter for controlling a vehicle door lock.

3. The signal transmitter as in claim 1, further comprising:

an output circuit for outputting a second modulated signal based on the first modulated signal output from the modulator circuit;

a second push-pull circuit for executing a push-pull operation based on the second modulated signal output from the output circuit; and a second resonance circuit including a second coil antenna and a second capacitor and transmitting a transmission signal in a radio wave through a resonance of the second coil antenna and the second capacitor under the push-pull operation of the second push-pull circuit, wherein the first and second coil antennas are wound in orthogonal relationship with each other.

4. The signal transmitter as in claim 3, wherein:

the output circuit which outputs the signal obtained by shifting a phase of the first modulated signal as much as ¼ period thereof as the second modulated signal.

5. The signal transmitter as in claim 3, further comprising:

a power supply circuit supplied with an electric power from a power source to supply the power to the first and second resonance circuits;

a switching device connected between the power supply circuit and the power source to connect or disconnect between the power supply circuit and the power source; and a control circuit for controlling the switching device to connect the power supply circuit and the power source depending on start of input of the data signal and cut off the connection between the power supply circuit and the power source depending on the stop of input of the data signal.

6. The signal transmitter as in claim 5, wherein:

the power supply circuit includes a voltage regulator circuit.

7. The signal transmitter as in claim 3, wherein:

the first and second coil antennas are wound around magnetic members.

8. The signal transmitter as in claim 7, wherein:

each of the magnetic members is formed in a shape of a column; and one of the first and second coil antennas is wound to surround both end portions of the magnetic member in a longitudinal direction.

9. The signal transmitter as in claim 1, further comprising:

a modulation wave generating circuit for generating the ASK modulation wave; and a control circuit for controlling the modulation wave generating circuit to start generation of the ASK modulation wave depending on the input start of the data signal and stop generation of the ASK modulation wave depending on the input stop of the data signal.

10. A signal transmitter utilizing an ASK modulation wave, comprising:

a modulator circuit for outputting a modulated signal by executing an ASK modulation to a data signal using an ASK modulation signal;

a push-pull circuit for executing a push-pull operation based on the modulated signal output from the modulator circuit;

a resonance circuit including a coil antenna and a capacitor and transmitting a transmission signal in a radio wave through a resonance of the coil antenna and the capacitor during the push-pull operation of the push-pull circuit; and a switching device connected between the resonance circuit and the ground for switching connection and disconnection between the resonance circuit and the ground, wherein the modulator circuit controls the switching device to connect or disconnect the resonance circuit and the ground in synchronization with the modulated signal.

* * * * *